(12) United States Patent
Mita

(10) Patent No.: US 8,393,683 B2
(45) Date of Patent: Mar. 12, 2013

(54) AUTOMOTIVE SEAT HEADREST SUPPORTING APPARATUS

(75) Inventor: Kazuhiro Mita, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 300 days.

(21) Appl. No.: 12/736,879

(22) PCT Filed: Mar. 26, 2009

(86) PCT No.: PCT/JP2009/056111
§ 371 (c)(1),
(2), (4) Date: Nov. 18, 2010

(87) PCT Pub. No.: WO2009/142063
PCT Pub. Date: Nov. 26, 2009

(65) Prior Publication Data
US 2011/0062762 A1 Mar. 17, 2011

(30) Foreign Application Priority Data
May 22, 2008 (JP) .............................. P. 2008-133897

(51) Int. Cl.
*A47C 7/36* (2006.01)
(52) U.S. Cl. ........................................................ 297/410
(58) Field of Classification Search .................... 297/410
See application file for complete search history.

(56) References Cited

U.S. PATENT DOCUMENTS

| 6,655,742 B1 * | 12/2003 | Ozaki | 297/410 |
| 6,742,846 B1 * | 6/2004 | Isaacson | 297/410 |
| 6,969,118 B2 * | 11/2005 | Yamada | 297/410 |
| 7,255,401 B2 * | 8/2007 | Yokoyama et al. | 297/410 |
| 7,789,465 B2 * | 9/2010 | Reel | 297/410 |
| 2005/0212343 A1 | 9/2005 | Katahira | |

FOREIGN PATENT DOCUMENTS

| JP | 10-295484 A | 11/1998 |
| JP | 2003-52484 A | 2/2003 |
| JP | 2005-278845 A | 10/2005 |

* cited by examiner

*Primary Examiner* — Sarah B McPartlin
(74) *Attorney, Agent, or Firm* — McGinn IP Law Group, PLLC

(57) ABSTRACT

An automotive seat headrest supporting apparatus includes headrest supporting members and stay locking units 20 which are incorporated into the headrest supporting members 10 to lock stays 4. The headrest supporting member 10 has a stay guiding hole 13 into which the stay 4 is inserted and an incorporating recess 14 which is opened to an outer surface and which communicates with the stay guiding hole 13 within the headrest supporting member 10 from a direction intersecting the stay guiding hole 13. The stay locking unit 20 includes a stay lock body 30 which is slidably fitted in the incorporating recess 14, a locking bar 21 which is incorporated into the stay lock body 30 and a coil spring 22 which biases the stay lock body 30 in a direction in which the locking bar 21 is brought into engagement with a locking portion 4a of the stay 4. The stay lock body 30 is configured so that, after the locking bar 21 is accommodated and disposed in accommodation grooves 36, a locking bar holding member 41 is set to hold the locking bar 21 within the accommodation grooves 36.

7 Claims, 12 Drawing Sheets

AUTOMOTIVE SEAT HEADREST SUPPORTING APPARATUS

TECHNICAL FIELD

The present invention relates to a supporting apparatus for holding a headrest on a seat back portion of an automotive seat so that the height of the headrest can be adjusted freely.

BACKGROUND ART

For example, Patent Document 1 discloses a conventional automotive seat headrest supporting apparatuses of such type. As shown in FIG. 1 of Patent Document 1, a stay locking member (30) is provided in a stay holder (20) installed in a seat back portion of an automotive seat so as to be inserted and removed from an opening (24a). An opening portion (32) and hole portions (36) are formed in the stay locking member (30), and a locking rod (50) is inserted into the hole portions (36). Part of the locking rod (50) is exposed in the opening portion (32).

Stays (headrest stays) extending from the headrest of a motor vehicle are inserted into the inserting portions (24) of the stay holder (20) and penetrate through the opening portions (32) of the stay locking members (30).

The stay locking member (30) is biased in a horizontal direction by a coil spring (40), and the locking rod (50) is brought into engagement with a stopper groove in the headrest stay by the biasing force of the coil spring (40), whereby the headrest stay is fixedly positioned in place.

The parenthesized reference numerals are those described in Patent Document 1.

In the conventional headrest supporting apparatus disclosed in Patent Document 1, the locking rod (50) is designed to be inserted into the hole portions (36) formed in the stay locking member (30) from a side thereof so as to be incorporated into the stay locking member (30). However, the hole portions (36) communicate with the opening portion (32) inside the stay locking member (30). Because of this, the hole portions (36) are formed separately in both side portions of the stay locking member (30). Therefore, since a distal end portion of the locking rod (50) which is inserted into the hole portion (36) from the side is released in the opening portion (32) on its way to the other hole portion (36), there may be a risk of the distal portion of the locking rod (50) traveling in a direction which slightly deviates from the course to the other hole portion (36). As a result, the distal end portion of the locking rod (50) cannot be led to the other hole portion (36) in a smooth fashion, resulting in more complicated locking rod (50) incorporating work having to be performed than expected.

While Patent Document 1 describes that the locking rod (50) may be molded integrally with the stay locking member (30) through insert molding (refer to paragraph [0023]), such molding method deteriorates the productivity very much, leading to a problem that the production costs are increased to become expensive.

Further, in order to prevent the dislodgement of the locking rod (50) from the hole portions (36), Patent Document 1 discloses a configuration in which a groove portion (50a) is formed in the locking rod (50), while a projection (36a) is formed on the hole portions (36) of the stay locking member (30), so that the groove portion (50a) and the projections (36a) are brought into engagement with each other (refer to paragraph and FIG. 4 of Patent Document 1).

If the above-described configuration is provided, however, a large inserting force is required for the distal end portion of the locking rod (50) to ride over the projections (36a) when the locking rod (50) is inserted into the hole portions (36). Consequently, a tool such as a hammer is necessitated to perform the incorporating work of the locking rod (50), this deteriorating the workability further.

On the other hand, if the above-described dislodgement preventing construction is not provided, the locking rod (50) may be dislodged from the hole portions (36) due to vibrations or the like caused when the vehicle is running and then may be brought into abutment with an inner wall of the stay holder (20), disturbing the smooth inserting and removing operations of the stay locking member (30).
Patent Document 1: JP-H10-295484-A

DISCLOSURE OF THE INVENTION

Problem to be Solved by the Invention

The invention has been made in view of the above-described situations, and an object thereof is to provide an automotive seat headrest supporting apparatus in which the productivity is increased by facilitating incorporating work of a locking bar (a locking rod) in a stay lock body (a stay locking member) and the dislodgement of the locking bar from the stay lock body is prevented.

Means for Solving the Problem

For attaining the object, according to the invention, there is provided an automotive seat headrest supporting apparatus, including: a stay extending downwards from a headrest and having a plurality of locking portions which are formed in appropriate positions in an axial direction; a headrest supporting member to be installed in a seat back portion of an automotive seat; and a stay locking unit incorporated in the headrest supporting member to lock the stay, wherein the headrest supporting member has: a stay guiding hole into which the stay is inserted; and an incorporating recess which is opened to an outer surface and which communicates with the stay guiding hole within the headrest supporting member 10 from a direction intersecting the stay guiding hole, wherein the stay locking unit includes: a stay lock body which is slidably fitted into the incorporating recess and which has an insertion hole formed so that the stay inserted into the stay guiding hole is inserted thereinto within the incorporating recess; a locking bar which is incorporated into the stay lock body so that a portion thereof is exposed in the insertion hole to be brought into engagement with the locking portions on the stay which is inserted into the stay guiding hole; and a biasing member to bias the stay lock body in a direction in which the exposed portion of the locking bar which is exposed in the insertion hole is brought into abutment with the stay which is inserted into the stay guiding hole, wherein the stay lock body includes: a base member having an accommodation groove to accommodate the locking bar therein; and a locking bar holding member to be set on a surface of the base member, wherein the insertion hole is formed so as to penetrate through the base member and the locking bar holding member, respectively, wherein the accommodation groove is opened in the surface of the base member, and wherein the locking bar holding member set on the surface of the base member closes the accommodation groove so as to hold the locking bar within the accommodation groove.

According to the invention including the above-described configuration, since the incorporating work of the locking bar is completed only by disposing the locking bar in the accommodation groove on the surface of the base member of the stay lock body to be accommodated therein, and thereafter, setting the locking bar holding member on the surface of the base member, the incorporating work can be extremely simplified.

Figure 1:
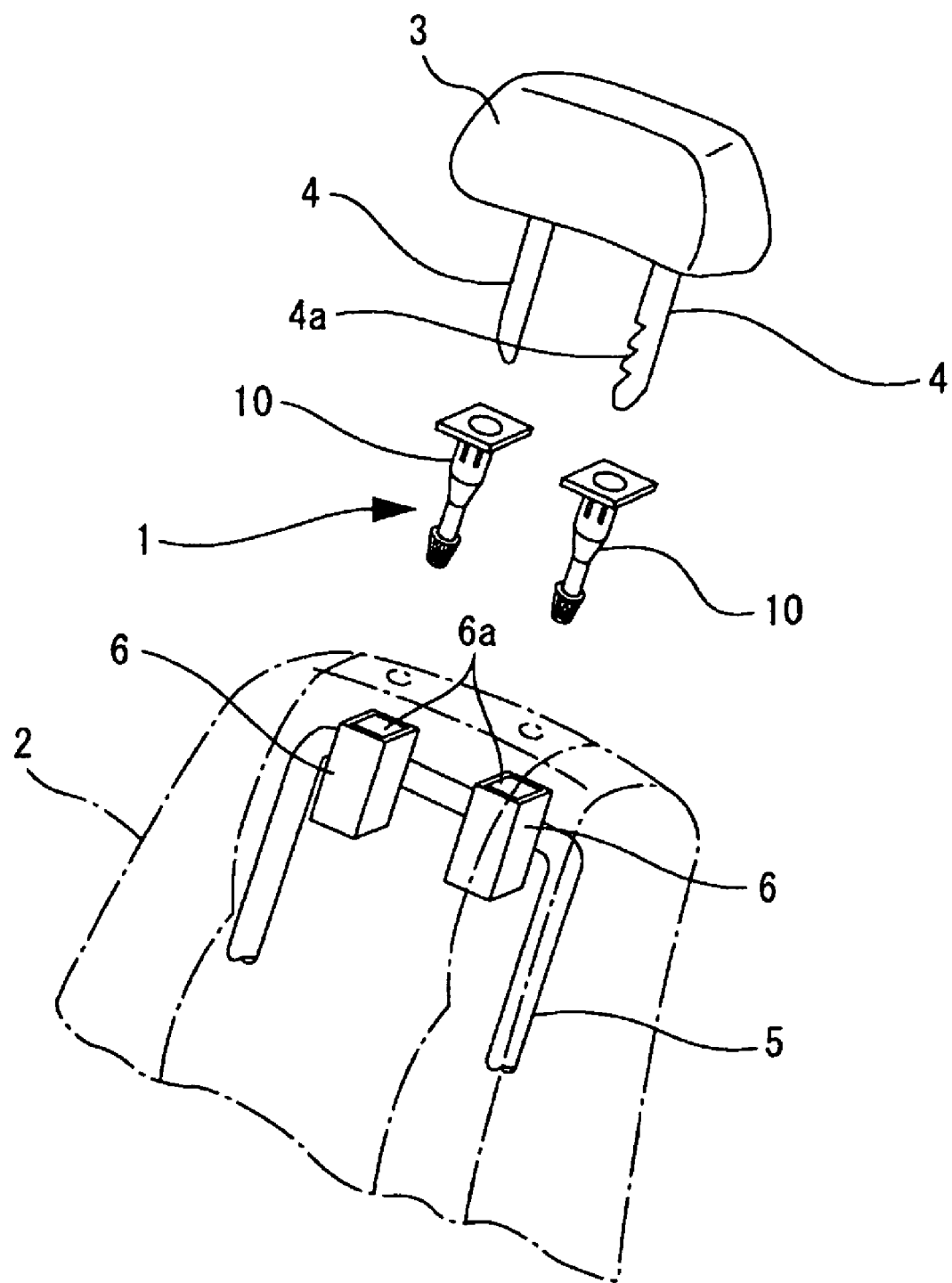
FIG. 1 is a perspective view showing schematically an automotive seat into which a headrest supporting apparatus according to a first embodiment of the invention is to be incorporated.

DESCRIPTION OF REFERENCE NUMERALS 1 headrest supporting apparatus; 2 automotive seat; 3 headrest; 4 stay; 4a locking portion; 5 frame; 6 bracket; 6a supporting hole; 10 headrest supporting member; 11 head portion; 12 extending portion; 13 stay guiding hole; 14 incorporating recess; 15 guide portion; 16 engagement portion; 20 stay locking unit; 21 locking bar; 22 coil spring; 30 stay lock body; 31 base member; 32 hinge portion; 33 operating portion; 36 accommodation groove; 36a expanded space; 37 side wall (stopper); 37a projection (stopper); 38 elongated hole; 38a holding projection; 39 positioning hole; 40 supporting projection; 41 locking bar holding member; 42 arm portion; 43 connecting portion (rigidity strengthening wall); 44 rigid portion; 45 elastic portion; 46 pressing projection; 47 positioning projection; 48 locking claw; 49 holding locking claw; 50 elongated guiding projection; 60 connecting portion (rigidity strengthening wall); 61, 62 reinforcement recess; 63, 64 reinforcement projection.

BEST MODE FOR CARRYING OUT THE INVENTION

Hereinafter, a best mode for carrying out the invention will be described in detail by reference to the drawings.

First Embodiment

FIGS. 1 to 6B illustrate a headrest supporting apparatus according to a first embodiment of the invention.

FIG. 1 is a perspective view showing schematically an automotive seat into which a headrest supporting apparatus according to this embodiment is to be incorporated.

As shown in FIG. 1, a headrest supporting apparatus 1 of the embodiment is mounted at an upper portion of an automotive seat 2 to support a headrest 3. Normally, a frame 5 is placed inside a seat back of the automotive seat 2, and a pair of left and right brackets 6 are assembled to the frame 5. Supporting holes 6a, 6a are formed in the respective brackets 6, 6, and headrest supporting members 10, 10 are installed in the supporting holes 6a, 6a, respectively.

On the other hand, a pair of left and right stays 4, 4 are provided on the headrest 3 so as to extend downwards from a lower surface of the headrest 3. The headrest 3 can slidably be mounted at a top of the automotive seat 2 by inserting the stays 4, 4 into the headrest supporting members 10, 10. Plural locking portions 4a are formed on each stay 4 in an axial direction thereof, and these locking portions 4a are locked by a stay locking unit 20 (refer to FIG. 2), which will be described later. The headrest 3 is prevented from falling from the automotive seat 2 by the locking portions 4a being locked by the stay locking unit 20.

Figure 2:
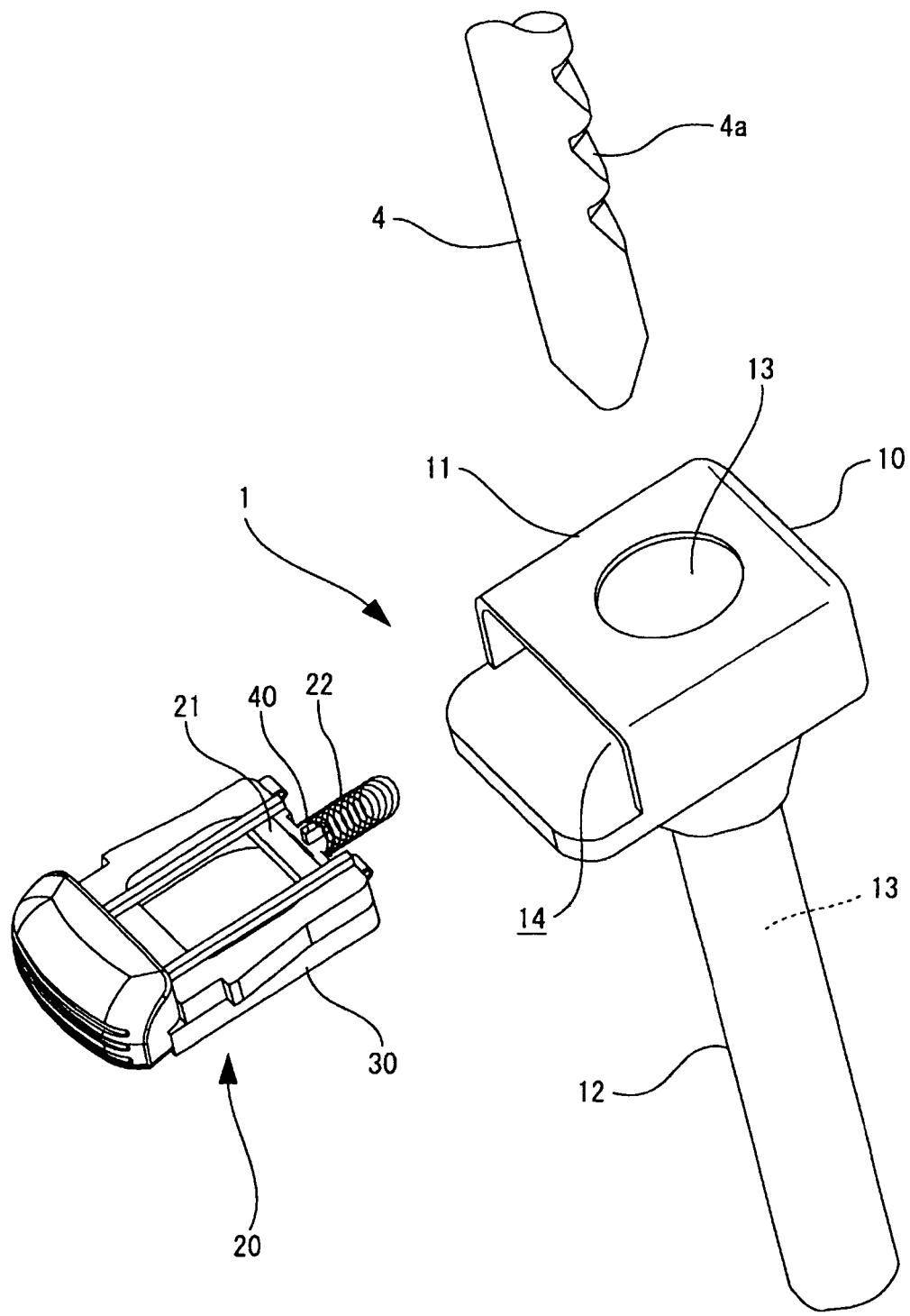
FIG. 2 is an exploded perspective view showing the configuration of the headrest supporting apparatus according to the first embodiment of the invention.

FIG. 2 is an exploded perspective view showing the configuration of the headrest supporting apparatus according to this embodiment.

As shown in FIG. 2, the headrest supporting apparatus includes the headrest supporting members 10 and the stay locking unit 20.

The headrest supporting member 10 has a head portion 11 and an extending portion 12 which extends from a lower surface of the head portion 11. A stay guiding hole 13 is formed in the headrest supporting member 10 so as to be opened to an upper surface of the head portion 11 and to penetrate through the extending portion 12. The stay 4 of the headrest 3 shown in FIG. 1 is inserted into the stay guiding hole 13 of the head portion 11.

An incorporating recess 14 is formed in the head portion 11 of the headrest supporting member 10 so as to extend in a direction which is at right angles to an axis of the stay guiding hole 13. This incorporating recess 14 is opened to a lateral side of the head portion 11 and communicates with the stay guiding hole 13 thereinside. The stay locking unit 20 is slidably fitted in the incorporating recess 14.

Figure 5A:
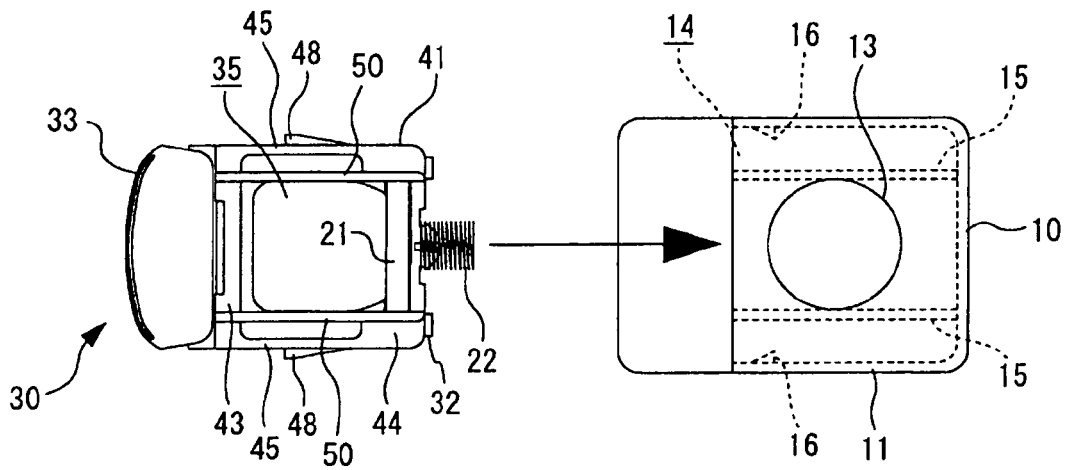
FIGS. 5A to 5C are plan views describing a fitting operation of the stay locking unit into a headrest supporting member.

As shown in FIG. 5A, inside the incorporating recess 14, groove-like guide portions 15 are formed in a ceiling surface thereof, and further, engagement portions 16 are formed on inner surfaces so as to project therefrom. As will be described later, the guide portions 15 guide slidably the stay lock body 30, and the engagement portions 16 restrict the dislodgement of the stay lock body 30.

As shown in FIG. 2, the stay locking unit 20 includes the stay lock body 30, a locking bar 21 and a coil spring (a biasing member) 22. The locking bar 21 is a flat plate-like metallic member cut to dimensions so as to be accommodated in the stay lock body 30.

Figure 3A:
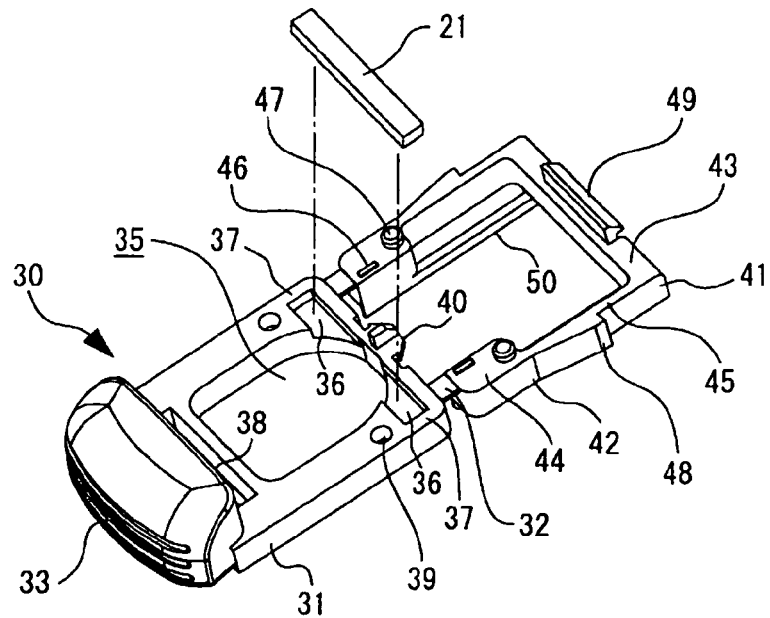
FIGS. 3A to 3C show perspective views depicting an assembling procedure of a stay locking unit.
Figure 3B:
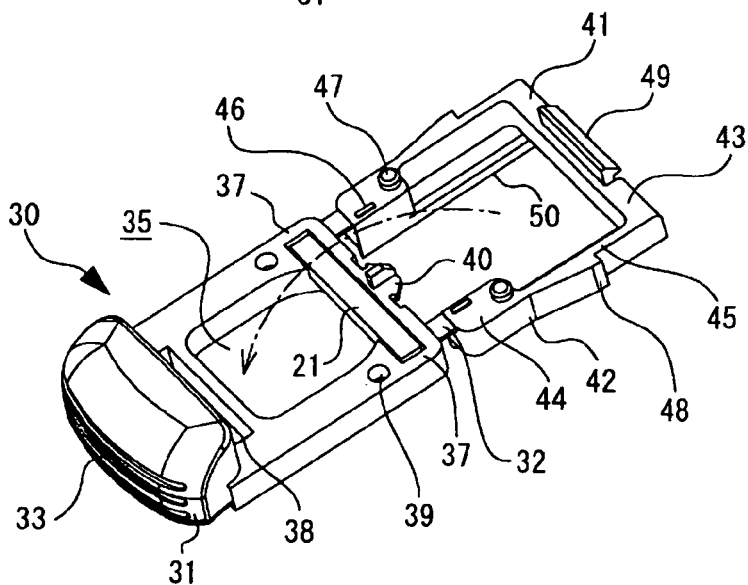
Figure 3C:
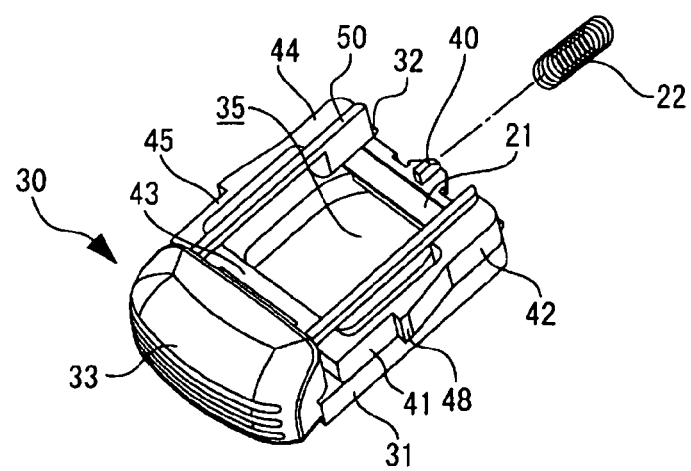
Figure 4:
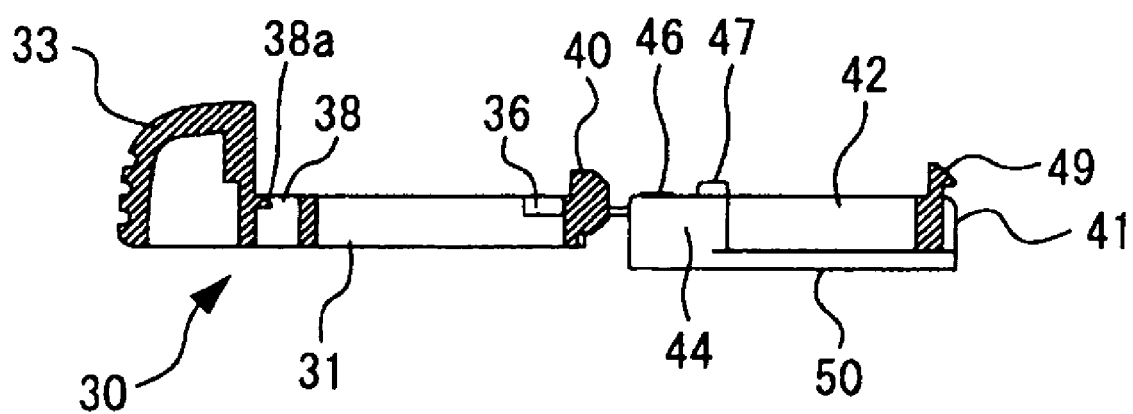
FIG. 4 is a side sectional view of a stay lock body in a deployed state.

FIGS. 3A to 3C are perspective views showing a stay locking unit assembling procedure, and FIG. 4 is a side sectional view showing a state where the stay lock body is deployed.

As shown in these figures, the stay lock body 30 of this embodiment includes a base member 31 and a locking bar holding member 41 to be set on an upper surface (a surface) of the base member 31. The stay lock body 30 is a resin molded part in which the base member 31 and the locking bar holding member 41 are molded integrally of a synthetic resin, and the base member 31 and the locking bar holding member 41 are connected via a flexible hinge portion 32. By integrally constructing the stay lock body 30 as described above, the storage, transport and handling of the stay lock body 30 can be facilitated, thereby increasing the productivity of the headrest supporting apparatus.

An operating portion 33 is formed on a front surface of the base member 31 of the stay lock body 30. A designed surface is applied to the surface of the operating portion 33 so as to be press-operated by the user. In addition, an insertion hole 35 is formed in a center of the base member 31 so that the stay 4 is inserted therethrough. Further, accommodation grooves 36 are formed in both side portions of a proximal portion of the base member 31. The accommodation grooves 36 are opened in the surface of the base member, and both end portions of the locking bar 21 are accommodated therefrom. An intermediate portion of the locking bar 21 is exposed in the insertion hole 35. In addition, ends of both the accommodation grooves 36 are closed by side walls 37. These side walls function as stoppers to prevent the dislodgement of the locking bar 21 from the base member 31.

An elongated hole 38 is formed in a front portion of the base member, and a holding projection 38a is formed on an edge portion of the elongated hole 38 so as to project therefrom. In addition, positioning holes 39 are formed in both the side portions of the proximal portion of the base member, and a supporting projection 40 is formed on a proximal end face of the base member 31 to hold one end of the coil spring 22.

The locking bar holding member 41 has a pair of arm portions (both side portions) 42 and a connecting portion 43 which connects respective rear end portions (rear end portions when the stay lock body 30 is in its deployed state) of the arm portions 42 together. The locking bar holding member 41 is formed into a U-shape by the arm portions 42 and the connecting portion 43. Respective front end portions of the arm portions 42 are connected to a rear end portion of the base member 31 via the hinge portion 32. By the hinge portion 32 being folded, the locking bar holding member 41 is set on the surface (the upper surface) of the base member 31 (refer to FIG. 3C).

A holding locking claw 49 is formed on the connecting portion 43 of the locking bar holding member 41. This holding locking claw 49 is brought into engagement with the holding projection 38a of the base member 31, whereby a state where the locking bar holding member 41 is set on the surface of the base member 31 is held.

The arm portion 42 of the locking bar holding member 41 includes a rigid portion 44 having a sufficient width and an elastic portion 45 which is cut on an inner side so as to be narrowed in width. The rigid portion 44 is positioned to confront the accommodation groove 36 when set on the surface of the base member 31 to close the accommodation groove 36. A pressing projection 46 and a positioning projection 47 are formed on a surface of the rigid portion 44 which confronts the base member 31. When the rigid portion 44 closes the accommodation groove 36, the pressing projection 46 presses against the locking part 21 accommodated in the accommodation groove 36. In addition, the positioning projection 47 is formed on the surface of the base member 31 so as to fit in the positioning hole 39 to thereby prevent the loosening of the locking bar holding member 41.

Figure 5B:
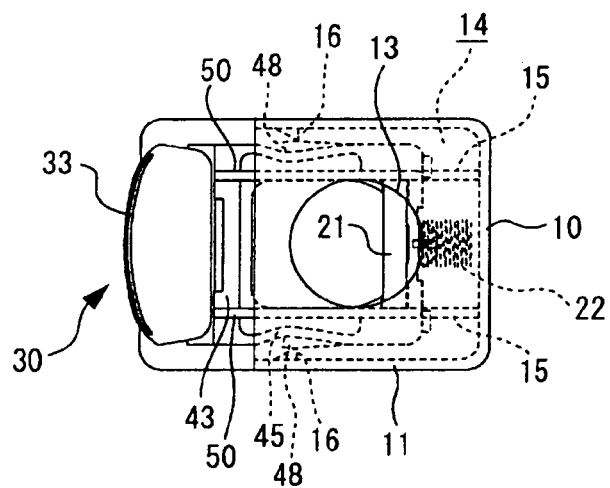

The elastic portion 45 of the arm portion 42 can flex elastically. A locking claw 48 is formed on an outer surface of the elastic portion 45 so as to project therefrom. As shown in FIG. 5B, the locking claws 48 are brought into engagement with the engagement portions 16 formed within the incorporating recess 14 of the headrest supporting member 10 so as to restrict the dislodgement of the locking bar holding member 41 (that is, the stay lock body 30).

When the stay lock body 30 is fitted in the incorporating recess 14 in the headrest supporting member 10, the locking claws 48 which project from the outer surfaces of the arm portions 42 need to ride over the engagement portions 16 in the incorporating recess 14. Therefore, the locking claws 48 are made to ride over the corresponding engagement portions 16 by forming the elastic portions 45 so as to elastically flex.

Elongated guiding projections 50 are formed on a surface (an upper surface, when the locking bar holding member 41 is set on the base member 31) of the locking bar holding member 41 so as to extend in a straight line from the rigid portions 44 to the connecting portion 43. The elongated guiding projections 50 pass through positions which lie further inwards and upwards than the cut inner surfaces of the elastic portions 45 and are spaced apart therefrom. Because of this, even through the elastic portions 45 are elastically deformed, the elongated guiding projections 50 are not be deformed. The pressing projections 46 formed on the rigid portions 44 are formed in positions which confront the elongated guiding projections 50.

When resin molding the parts described in Patent Document 1 such the stay locking members, since locking pin insertion holes are provided in both left and right (or front and rear) end portions of a mold, the mold is slid to be divided in a left-right (or a front-rear) direction in addition to a vertical division in which the mold is divided in a vertical direction. Contrary, the stay lock body 30 of the embodiment can be resin molded only by dividing a mold in the vertical direction. Since the operating portion 33 formed on the front surface of the base member 31 constitutes the designed surface, only a portion of the mold which forms the operating portion 33 is preferably slid in a lateral direction in view of maintaining an appearance.

Next, referring to FIGS. 3A to 3C, an assembling procedure of the stay locking unit will be described.

As shown in FIG. 3A, firstly, the locking bar 21 is accommodated to be disposed in the accommodation grooves 36 in the base member 31. Thereafter, as shown in FIG. 3B, the hinge portion 32 is bent so that the locking bar holding member 41 is set on the surface of the base member 31. As this occurs, the positioning projections 47 on the locking bar holding member 41 fit in the positioning holes 39 in the base member 31, and the holding locking claws 49 are brought into engagement with the holding projections 38a, whereby a state where the locking bar holding member 41 is set on the surface of the base member 31 is held without any looseness.

In this way, in this embodiment, the locking bar 21 can easily be incorporated only by setting the locking bar holding member 41 on the surface of the base member 31 after the locking bar 21 has been accommodated in the accommodation grooves 36.

After the locking bar 21 has been incorporated in the stay lock body 30, as shown in FIG. 3C, the coil spring 22 is mounted on the supporting projection 40 on the stay lock body 30, whereby the assemblage of the stay locking unit 20 is completed.

Figure 5C:
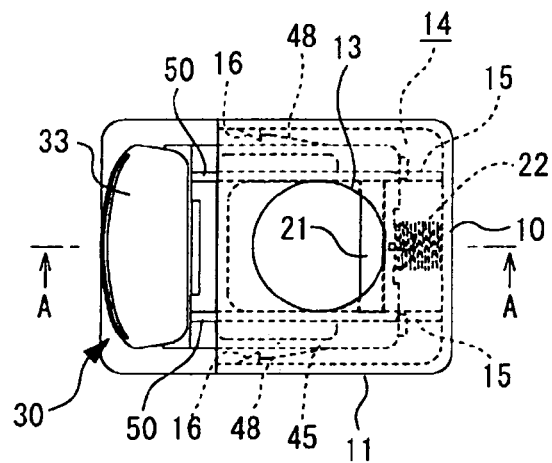
Figure 6A:
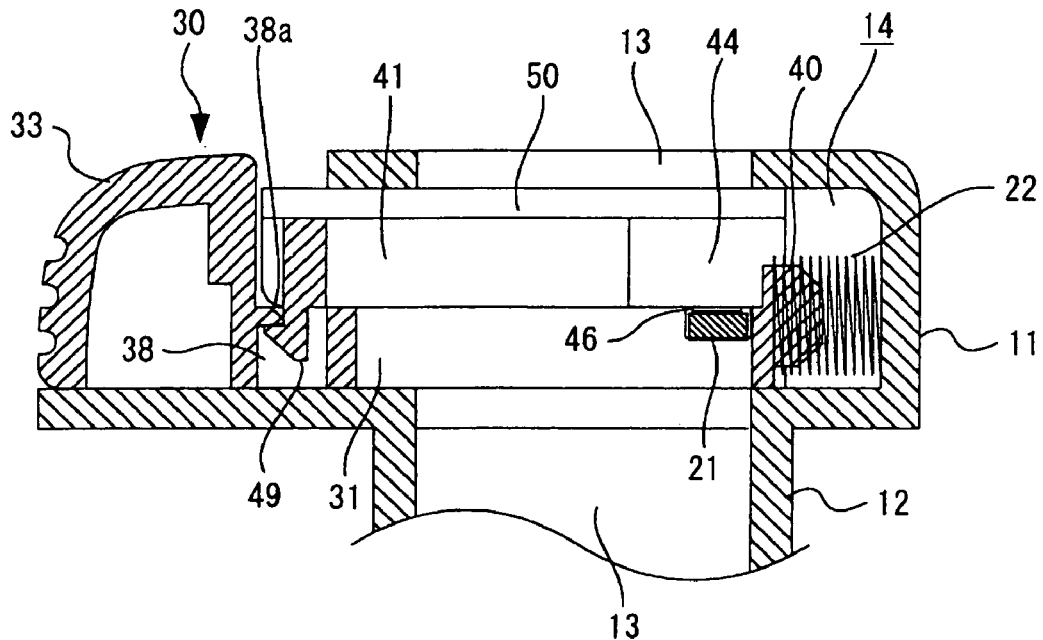
FIG. 6A is an enlarged sectional view taken along the line A-A in FIG. 5C.
Figure 6B:
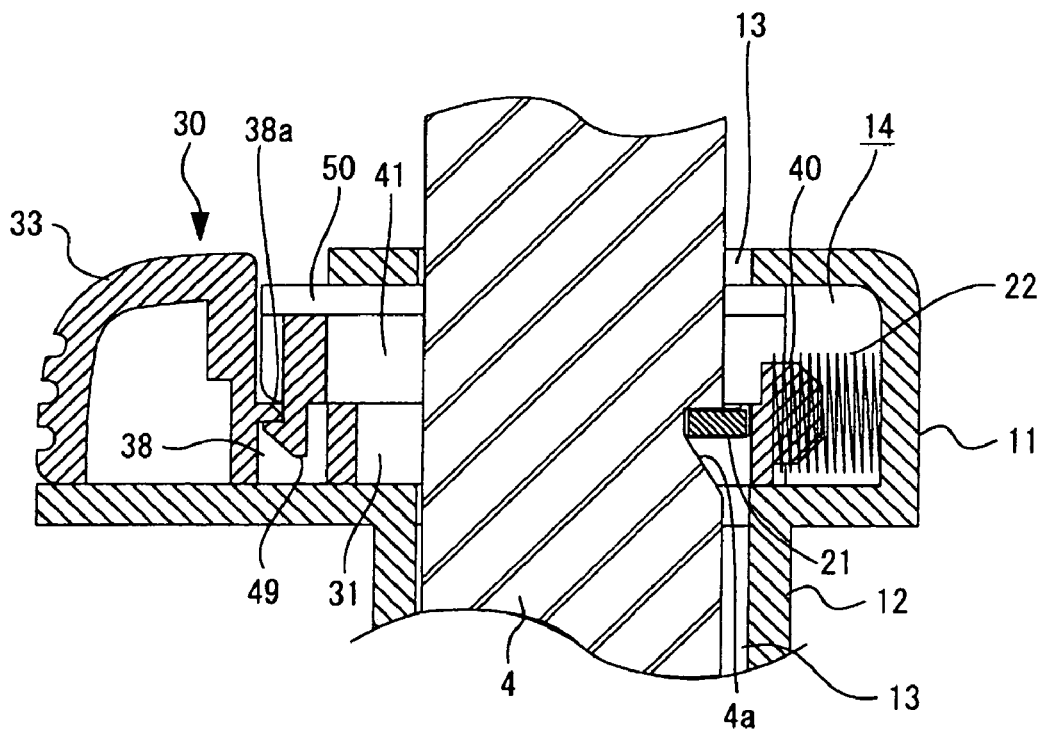
FIG. 6B is an enlarged sectional view showing a state where a stay is inserted into the stay locking unit shown in FIG. 6A.

FIGS. 5A to 5C are plan views which illustrate a fitting operation of the stay locking unit into the headrest supporting member. FIG. 6A is an enlarged sectional view taken along the line A-A in FIG. 5C, and FIG. 6B is an enlarged sectional view showing a state where the stay is inserted in the stay locking unit shown in FIG. 6A.

The stay locking unit 20 is fitted in the incorporating recess 14 in the headrest supporting member 10 (refer to FIG. 2).

When fitting the stay locking unit 20, the elongated guiding projections 50 on the stay lock body 30 are brought into engagement with the guide portions 15 formed in the incorporating recess 14 so that the stay lock body 30 slides along the guide portions 15.

As shown in FIG. 5B, when the locking claws 48 of the locking bar holding member 41 are brought into abutment with the engagement portions 16 inside the incorporating recess 14 in the midst of the stay locking unit 20 being fitted into the incorporating recess 14, the elastic portions 45 of the locking bar holding member 41 deflect elastically, whereby the interference of the locking claws 48 with the engagement portions 16 can be avoided so that the locking claws 48 are allowed to be pushed into the incorporating recess 14. As this occurs, even though the elastic portions 45 deflect elastically, the elongated guiding projections 50 are prevented from being deformed as has been described before.

As shown in FIG. 5C, in the incorporating recess 14 in the headrest supporting member 10, the coil spring 22 biases the stay lock body 30 in a direction in which the stay lock body 30 is pushed out of the incorporating recess 14. On the other hand, the stay lock body 30 is prevented from being dislodged from the incorporating recess 14 by the engagement between the locking claw portions 48 and the engagement portions 16. In addition, since the stay lock body 30 slide along the guide portions 15 at the elongated guiding projections 50 formed thereon, the stay lock body 30 slides smoothly relative to the headrest supporting member 10, thereby realizing good operability over a long period of time.

As shown in FIG. 6A, when the locking bar 21 accommodated in the accommodation grooves 36 attempts to rise therefrom, a reaction force acts from the ceiling surface inside the incorporating recess 14 via the elongated guiding projections 50, the rigid portions 44 and the pressing projections 46 on the locking bar holding member 41, whereby the rising of the locking bar 21 is prevented.

As shown in FIG. 6B, the locking bar 21 is brought into engagement with the locking portion 4a of the stay 4 which is inserted into the stay guiding hole 13 in the headrest supporting member 10 by the biasing force from the coil spring 22, whereby the headrest 3 is positioned and held in place. In addition, the engagement of the locking part 21 with the locking portion 4a is cancelled by the operating portion 33 of the stay lock body 30 being pushed in, whereby the stay 4 is allowed to move in the axial direction for adjustment of the position thereof.

The invention is not limited to the above-described first embodiment, and the following variations can be available from the first embodiment.

[First Variation]

Figure 7A:
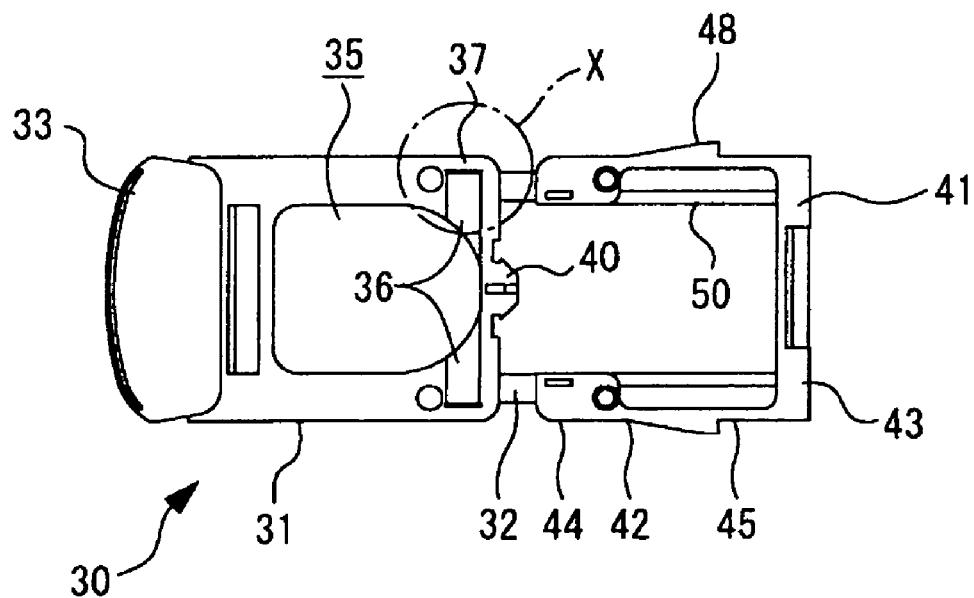
FIG. 7A is a plan view showing a first variation of the headrest supporting apparatus according to the first embodiment of the invention.
Figure 7B:
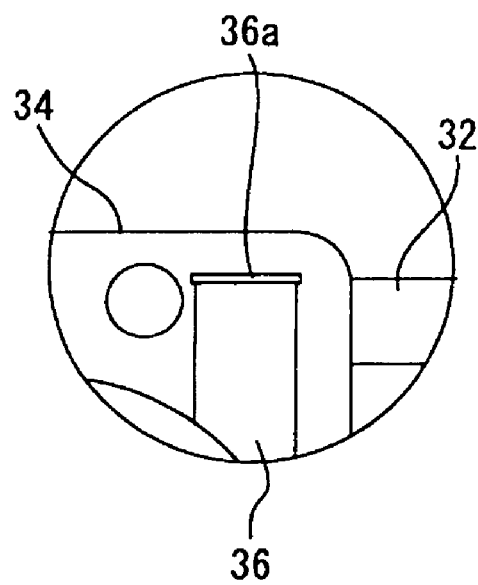
FIG. 7B is an enlarged view showing a portion X in FIG. 7A.

FIG. 7A is a plan view showing a first variation of the headrest supporting apparatus according to the first embodiment of the invention, and FIG. 7B is an enlarged view showing a portion X shown in FIG. 7A.

As shown in these figures, in the headrest supporting apparatus 1, expanded spaces 36a may be formed around the side end portions of the accommodation grooves 36 formed in the base member 31 of the stay lock body 30 to accommodate burrs remaining at end edges of the locking bar 21. Normally, when a metallic material is cut, burrs are produced on end faces thereof. If burrs so produced are in contact with bottom surfaces of the accommodation grooves 36, the locking bar 21 may be caused to rise or rattle within the accommodation grooves 36.

However, by providing the expanded spaces 36a as shown in FIG. 7B, burrs remaining on the end edges of the locking bar 21 are accommodated within the expanded spaces 36a without removing it, whereby the locking bar 21 can be disposed in the accommodation grooves 36 in a proper posture. Consequently, burr removing work can be omitted, thereby increasing the productivity of the headrest supporting apparatus.

[Second Variation]

Figure 8:
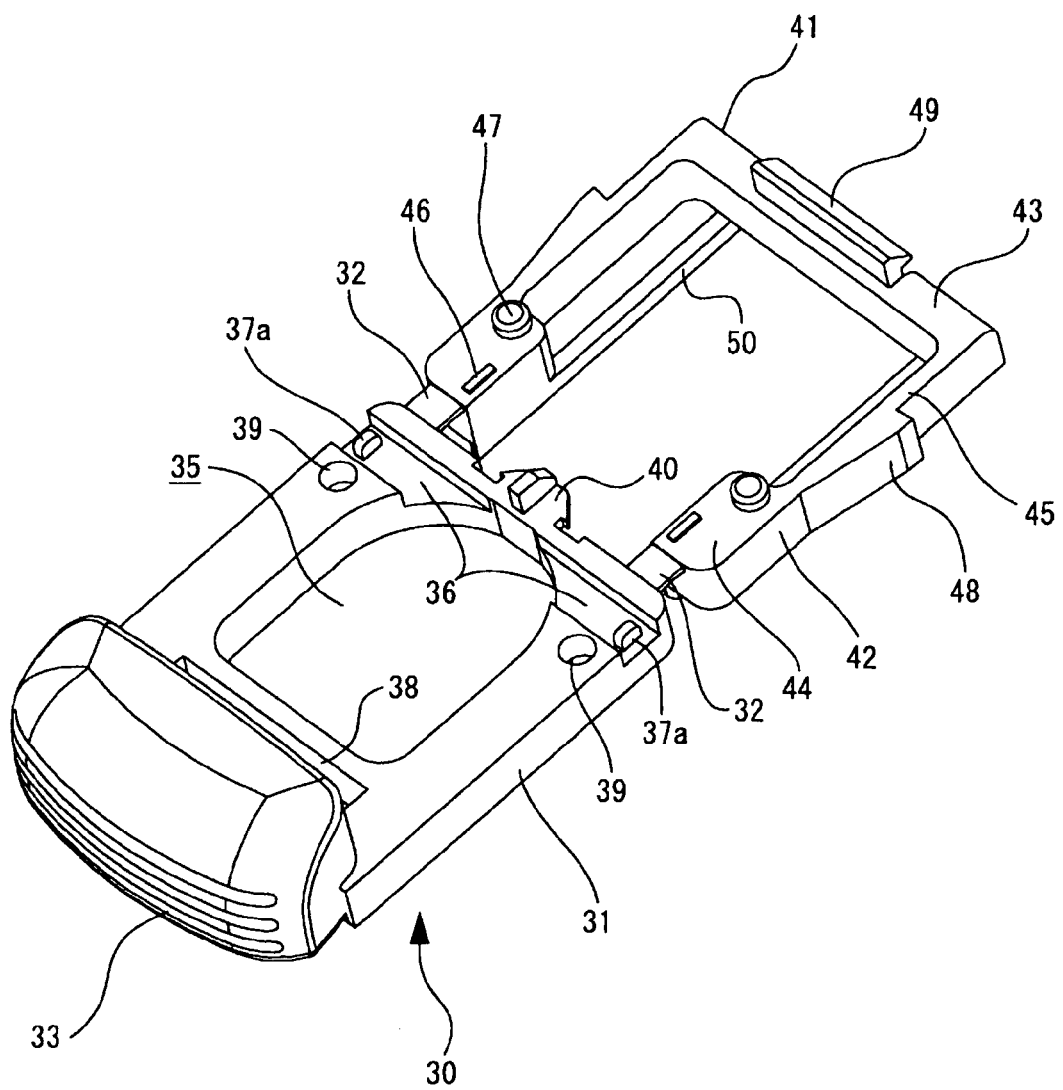
FIG. 8 is a perspective view showing a second variation of the headrest supporting apparatus according to the first embodiment of the invention.

FIG. 8 is a perspective view showing a second variation of the headrest supporting apparatus according to the first embodiment of the invention.

As shown in FIG. 8, stoppers that are to be formed at the side end portions of the accommodation grooves 36 in the stay lock body 30 can be formed by projections 37a which project from the accommodation grooves 36. An axial movement of the locking part 21 accommodated in the accommodation grooves 36 can also be restricted by these projections 37a.

[Third Variation]

Figure 9:
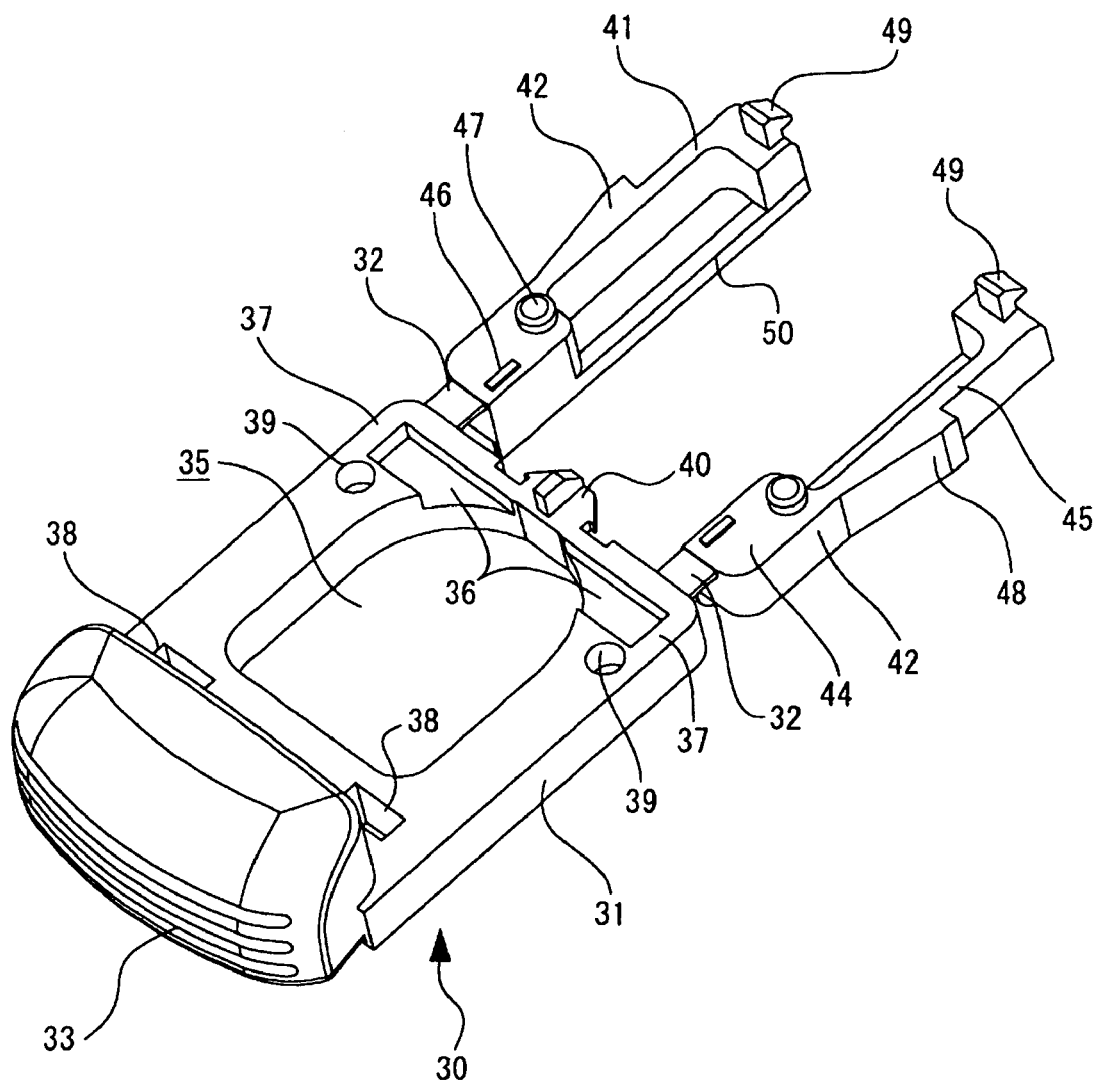
FIG. 9 is a perspective view showing a third variation of the headrest supporting apparatus according to the first embodiment of the invention.
Figure 10:
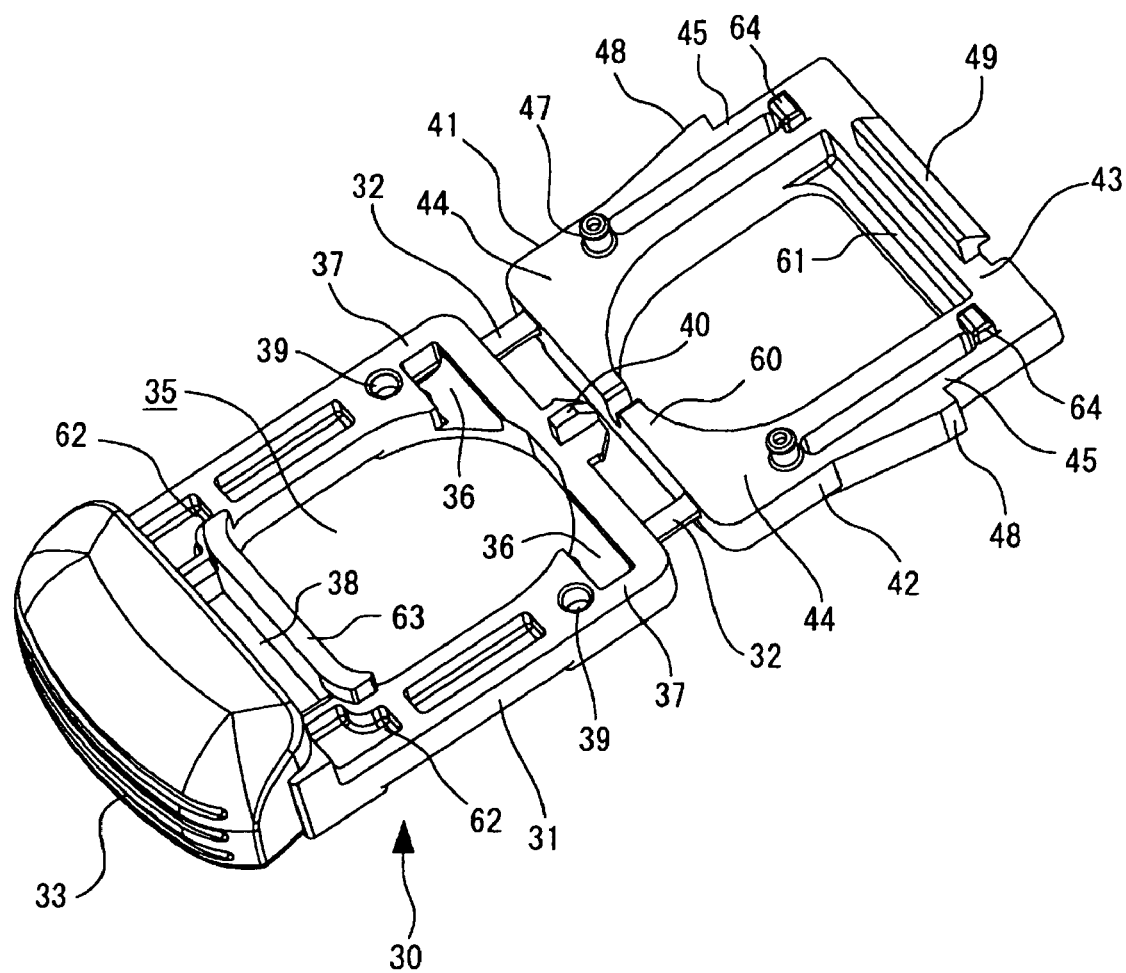
FIG. 10 is a perspective view showing a stay lock body according to a second embodiment of the invention in a deployed state.
Figure 11:
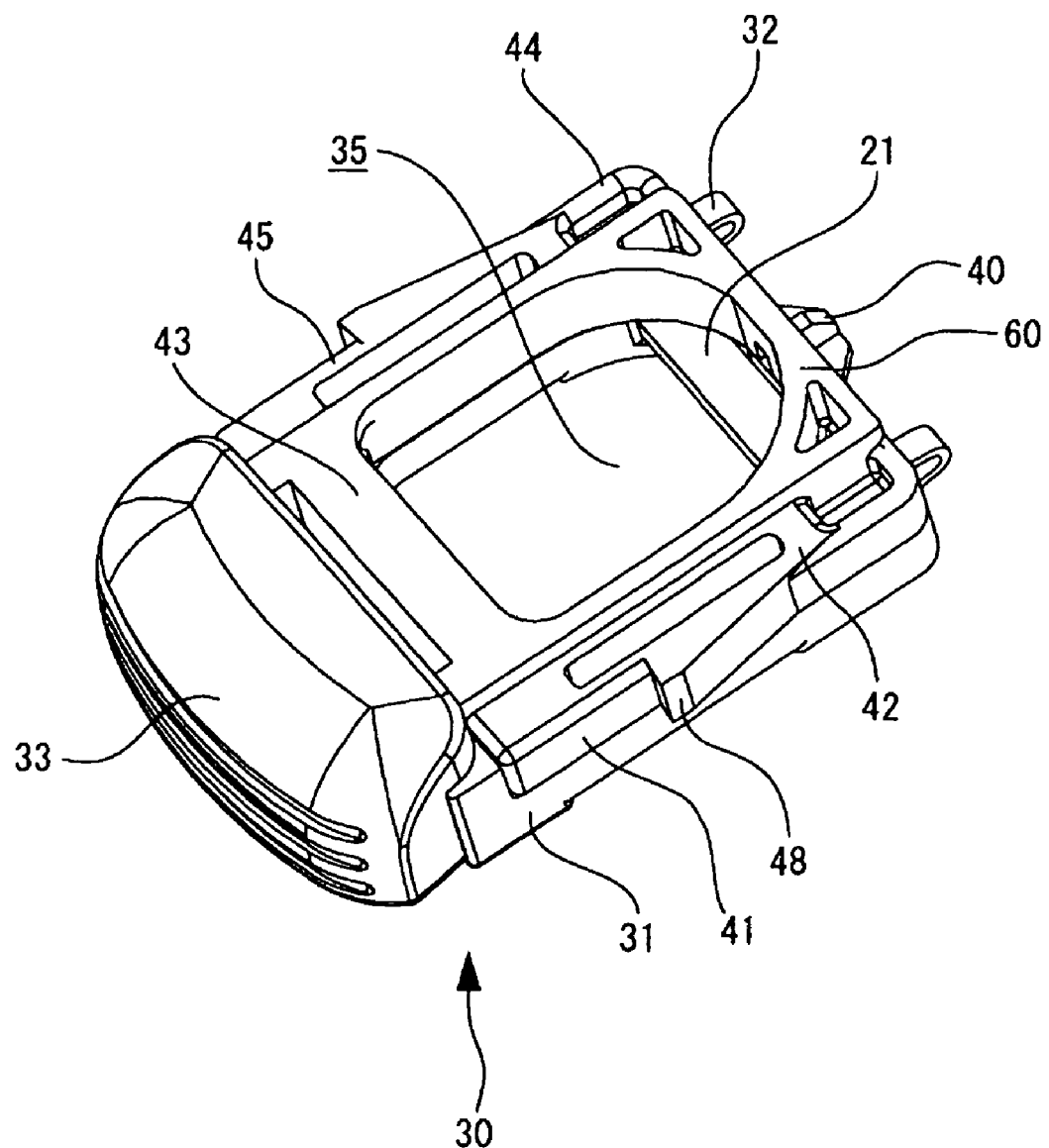
FIG. 11 is a perspective view of a stay locking unit according to the second embodiment of the invention.

FIG. 9 is a perspective view showing a third variation of the headrest supporting apparatus according to the first embodiment of the invention.

As shown in FIG. 9, the headrest supporting apparatus 1 may be such that the connecting portion 43 of the locking bar holding member 41 is omitted so that the individual arm portions 42 are allowed to move separately. Namely, the locking bar holding member 41 can take various forms which have the function to hold the locking bar 21 accommodated in the accommodation grooves 36 in the base member 31.

In the above-described embodiment, while the base member 31 and the locking bar holding member 41 of the stay lock body 30 are integrally formed to be connected together by the hinge portion 32, these members can also be molded as separate members as required.

Second Embodiment

Next, a second embodiment of a headrest supporting apparatus according to the invention will be described.

FIGS. 10 to 12B are drawings showing a headrest supporting apparatus according to the second embodiment of the invention.

Like reference numerals will be given to constituent elements of the headrest supporting apparatus according to the second embodiment which are like to those of the above-described first embodiment, and the detailed description thereof will be omitted.

Constituent elements to increase the rigidity of a stay lock body 30 are added to the headrest supporting apparatus according to the second embodiment.

Namely, in a locking bar holding member 41, arm portions 42 (both side portions) in which elastic portions 45 are formed are connected not only to rear end portion but also to a front end portion in a deployed state. Connecting portions 60, 43 which connect front end portions and rear end portions of these arm portions 42 constitute rigidity strengthening walls to increase the rigidity of the locking bar holding member 41.

For locking claws 48 formed at the arm portions 42 of the locking bar holding member 41 to ride over engagement portions 16 provided inside an incorporating recess 14 in the headrest supporting member when a stay locking unit 20 is fitted into a headrest supporting member 10 as shown in FIGS. 5A to 5C, portions of the arm portions 42 are formed into the elastic portions 45. The locking claws 48 can be entered within the incorporating recess 14 in the headrest supporting member 10 by virtue of the deflectable elastic portions 45 deflecting elastically.

However, when the elastic portions 45 are formed in the arm portions 42, the rigidity of the locking bar holding member 41 against an external force becomes small. For example, when an external force is applied to the locking bar holding member 41 from an oblique direction deviated from an axis in a horizontal plane by an arbitrary angle, bending stress is generated in the elastic portions 45 to cause a bent deformation therein. In particular, in a configuration as shown in the above-described first embodiment in which the front end portion of the locking bar holding member 41 is made to constitute the free end so that the locking bar holding member 41 is connected to the base member 31 only at the hinge portion 32, the elastic portions 45 are easily bent and deformed.

If the elastic portions 45 are bent and deformed, distortion is generated in the locking bar holding member 41, whereby the locking claws 48 ride over the engagement portions 16 to cancel the engaged state occurring therebetween. As a result, the stay locking unit 20 may be dislodged from the incorporating recess 14 in the headrest supporting member 10.

In this embodiment, the rigidity of the locking bar holding member 41 is increased by connecting together the front end portions and the rear end portions of the arm portions 42 by the connecting portions (the rigidity strengthening walls) 60, 43, respectively, to thereby avoid the drawback attributed to the bent deformation described above.

Further, reinforcement recesses 61, 62 and reinforcement projections 63, 64 are formed between the locking bar holding member 41 and a base member 31. These reinforcement recesses 61, 62 and the reinforcement projections 63, 64 are formed around an operating portion 33 in a state where the locking bar holding member 41 is set on a surface of the base member 31 (refer to FIG. 1) so as to be brought into abutment with each other to resist a tensile force which is applied to the operating portion 33. Namely, since the tensile force applied to the operating portion 33 formed at a front portion of the stay lock body 30 is borne by the reinforcement recesses 61, 62 and the reinforcement projections 63, 64 positioned around the operating portion 33, the tensile force is made difficult to be transmitted to other portions of the stay lock body 30 where the strength is relatively small (for example, the elastic portions 45), thereby effectively reinforcing the stay lock body 30.

Figure 12A:
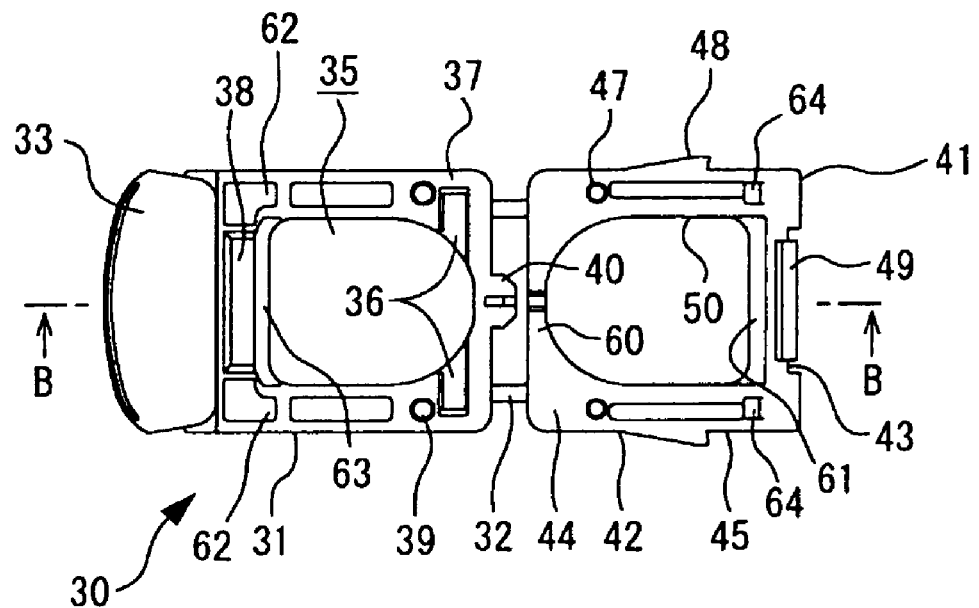
FIG. 12A is a plan view showing the stay lock body according to the second embodiment of the invention in the deployed state.
Figure 12B:
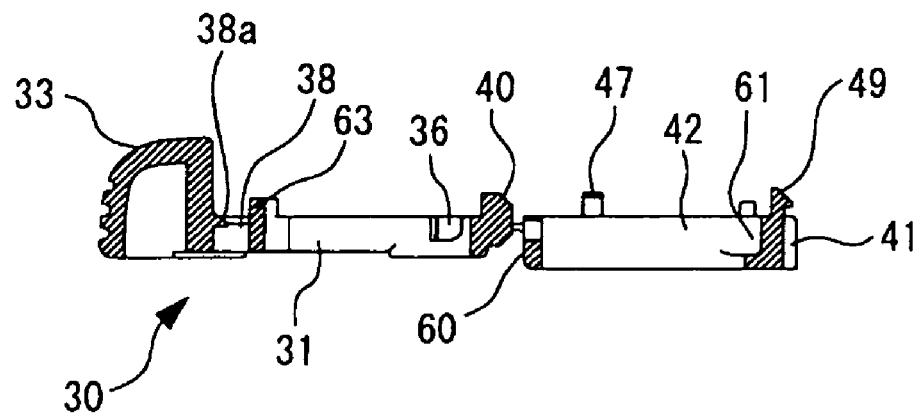
FIG. 12B is a sectional view taken along the line B-B in FIG. 12A.

Here, the reinforcement recess 61 and the reinforcement projection 63 are formed along and just behind a portion where a holding locking claw 49 is brought into engagement with a holding projection 38*a* (refer to FIG. 12). Moreover, a slight gap is formed between the reinforcement projection 63 and the holding locking claw 49, whereby the reinforcement projection 60 is constructed so as to bear the tensile force transmitted from the operating portion 33 in a state where the reinforcement projection 63 is independent from the holding locking claw 49. Consequently, there is caused no such drawback that the reinforcement projection 63 is brought into contact with the holding locking claw 49 to cancel the engaged state between the holding locking claw 49 and the holding projection 38*a*.

The reinforcement recesses 62 and the reinforcement projections 64 are positioned on both sides of the reinforcement recess 61 and the reinforcement projection 63, respectively.

In this way, according to the headrest supporting apparatus of the second embodiment, since the rigidity thereof against an external force is high, the headrest supporting apparatus is made difficult to be deformed even if an excessive external force is applied thereto, and an unintentional dislodgement of the headrest supporting member 10 from the incorporating recess 14 can be prevented.

The invention is not limited to the above-described embodiments and can be variously altered or modified as required.

For example, as to the base member and the locking bar holding member of the stay lock body according to the invention, the side where the locking bar is accommodated constitutes the base member, while the side where the accommodated locking bar is held constitutes the locking bar holding member. There is no limitation on the positional relationship between these constituent elements, and hence, in a state where the locking bar holding member is set on the base member, the base member can be disposed on the upper side, while the locking bar holding member can be disposed on the lower side.

The invention claimed is:

1. An automotive seat headrest supporting apparatus, comprising:
    a stay extending downwards from a headrest and having a plurality of locking portions which are formed in appropriate positions in an axial direction;
    a headrest supporting member to be installed in a seat back portion of an automotive seat; and
    a stay locking unit incorporated in the headrest supporting member to lock the stay,
    wherein the headrest supporting member has:
        a stay guiding hole into which the stay is inserted; and
        an incorporating recess which is opened to an outer surface and which communicates with the stay guiding hole within the headrest supporting member 10 from a direction intersecting the stay guiding hole,
    wherein the stay locking unit includes:
        a stay lock body which is slidably fitted into the incorporating recess and which has an insertion hole formed so that the stay inserted into the stay guiding hole is inserted thereinto within the incorporating recess;
        a locking bar which is incorporated into the stay lock body so that a portion thereof is exposed in the insertion hole to be brought into engagement with the locking portions on the stay which is inserted into the stay guiding hole; and
        a biasing member to bias the stay lock body in a direction in which the exposed portion of the locking bar which is exposed in the insertion hole is brought into abutment with the stay which is inserted into the stay guiding hole,
    wherein the stay lock body includes:
        a base member having an accommodation groove to accommodate the locking bar therein; and
        a locking bar holding member to be set on a surface of the base member,
    wherein the insertion hole is formed so as to penetrate through the base member and the locking bar holding member, respectively,
    wherein the accommodation groove is opened in the surface of the base member, and wherein the locking bar holding member set on the surface of the base member closes the accommodation groove so as to hold the locking bar within the accommodation groove.

2. The apparatus of claim 1, wherein the base member and the locking bar holding member are connected together via a flexible hinge portion.

3. The apparatus of claim 1, wherein an engagement portion to restrict the dislodgement of the locking bar holding member is formed inside the incorporating recess in the headrest supporting member,
wherein deflectable elastic portions are formed at both side portions of the locking bar holding member,
wherein locking claws are formed on outer surfaces of the elastic portions so as to project therefrom, and
wherein, in the locking bar holding member, front ends and rear ends of both side portions where the elastic portions are formed are connected together by connecting portions, respectively.

4. The apparatus of claim 1, wherein an operating portion is formed at a front portion of the base member or the locking bar holding member, and
wherein reinforcement portions having recessed and projecting shapes are formed between the locking bar holding member and the base member and around the operating portion so as to be brought into abutment with each other to resist a tensile force applied to the operating portion.

5. The apparatus of claim 1, wherein a guide portion is formed in the headrest supporting member to slidably guide the stay lock body on an inner surface of the incorporating recess,
wherein an elongated guiding projection is formed on the locking bar holding member which is set on a surface of the base member so as to slide in the guide portion in the headrest supporting member, and
wherein the elongated guiding projection passes through a portion intersecting the accommodation groove and extends in a sliding direction in a state where the stay lock body is fitted in the incorporating recess in the headrest supporting member.

6. The apparatus of claim 5, wherein a pressing projection is formed on the locking bar holding member at a position corresponding to the elongated guiding projection so as to confront the locking bar in the accommodation groove in a state where the locking bar holding member is set on the surface of the base member to be brought into abutment with the locking bar.

7. The apparatus of claim 1, wherein an expanded space is formed around a lateral end portion of the accommodation groove to accommodate burrs remaining on an end edge of the locking bar.

* * * * *